Jan. 24, 1967  A. CYPRA ETAL  3,300,695
HIGH VOLTAGE CAPACITOR ARRANGEMENT
Filed April 13, 1961  2 Sheets-Sheet 1

INVENTORS
Arne Cypra
Friedrich Haentzschel
Erwin Munk
Gerhard Winter
By Michael S. Striker
Attorney

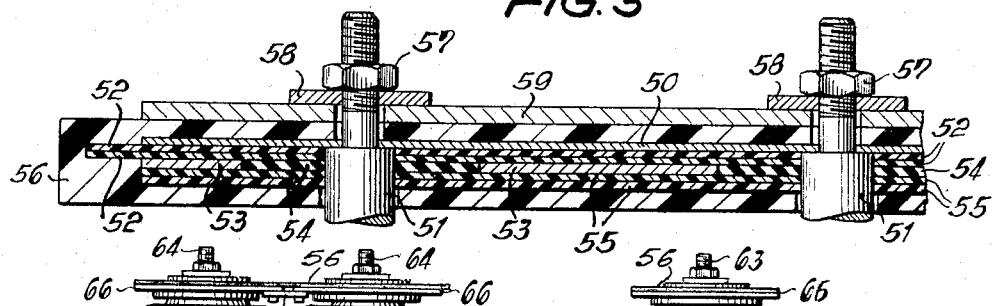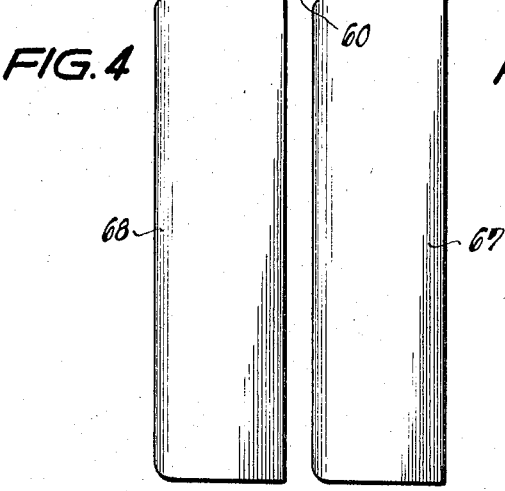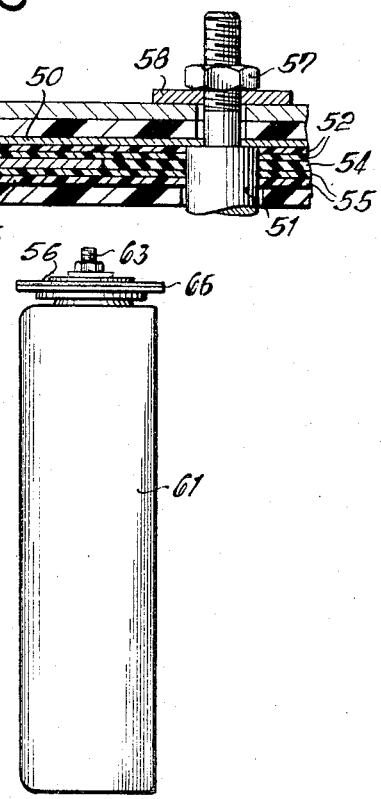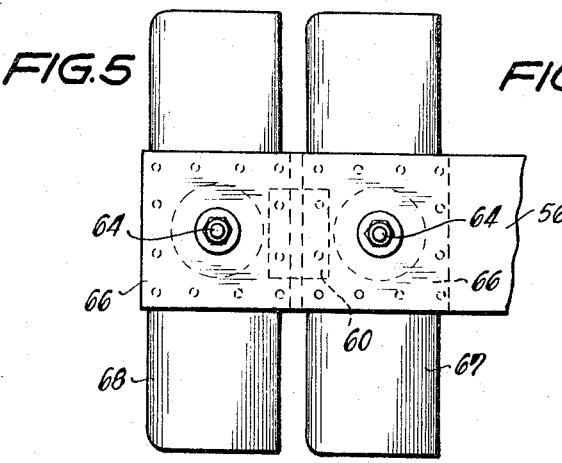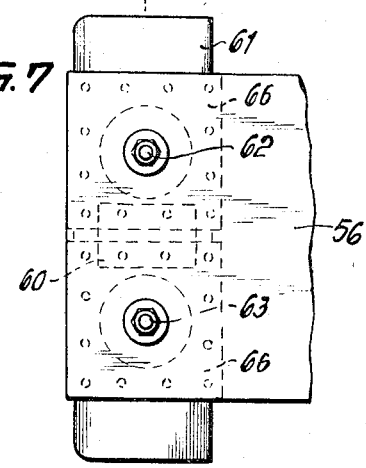

United States Patent Office 3,300,695
Patented Jan. 24, 1967

3,300,695
HIGH VOLTAGE CAPACITOR ARRANGEMENT
Arne Cypra, Stuttgart, Friedrich Haentzschel, Stuttgart-Zuffenhausen, Erwin Munk, Esslingen, and Gerhard Winter, Stuttgart-Frauenkopf, Germany, assignors to Robert Bosch G.m.b.H., Stuttgart, Germany
Filed Apr. 13, 1961, Ser. No. 102,861
Claims priority, application Germany, Apr. 14, 1960, B 57,485
15 Claims. (Cl. 317—260)

The present invention relates to a high voltage capacitor arrangement, and more particularly to a capacitor having a high capacity and being suitable for surge discharges.

Capacitors capable of storing electric energy of, for example, $2.10^6$ watt sec. are used in plasma physics, particularly for nuclear fusion tests, and are generally built of a set of interconnected capacitor units. Conventional capacitors having metal foil layers and insulating intermediate layers are not suitable for this purpose since their construction and volume causes a high self-inductance which necessitates operation at a reduced voltage in order to avoid breakdowns due to the high released energy. For example, a capacitor charged with the energy of $2.10^6$ watt sec. will release this entire energy in about $10^{-5}$ sec.

A substantial increase of the efficiency of capacitors for surge discharges, requires a substantial reduction of the self-inductance, not only regarding the inner construction of each of the capacitor units, but also as regards the manner of assembly and interconnection of the units in a housing. Particularly, high energy capacitor units of 1250 watt sec. or more, which are built up of a set of capacitor units connected in series or parallel and built into a common housing, pose particular problems as regards the self-inductance.

It is one object of the present invention to overcome the disadvantages of capacitors for surge discharges according to the prior art, and to provide a capacitor for this purpose having a low self-inductance.

Another object of the present invention is to provide a capacitor which will not breakdown if even very high amounts of energy are discharged within a very short time.

Another object of the present invention is to provide a capacitor for surge discharges which can be operated at very high voltage without breaking down.

Another object of the present invention is to provide a capacitor comprising a set of electrically interconnected capacitor units which are assembled in such a way as to have low self-inductance and high resistance to breakdowns.

A capacitor according to one embodiment of the invention comprises a condenser having connector plates at the ends thereof; a conductive case enveloping said condenser and having an opening in the region of one of the connector plates; insulating means for separating the condenser from the case, except for a connection in between the other condenser plate and the case; a first terminal passing through the opening in the case and being conductively connected to said one connector plate and insulated from the case; a second terminal adjacent the first terminal spaced and insulated therefrom and being conductively connected to the case, and a housing enveloping the case, and being insulated from the same.

In the preferred embodiment of the present invention, the capacitor is built of a plurality of capacitor units each of which comprises two columns of coiled tubular self-healing condensers which are located adjacent each other. These columns may consist of a single condenser, but may be built up of a plurality of condensers arranged in end to end relationship. Each condenser has connector plates at the end which constitutes an inner shunt. The connector plate at the ends of the respective columns abuts on large surfaces on the first terminal and on a connector member which has a large face abutting the conductive case. A housing envelopes the case, and is insulated from the same, except for a small wall portion in the region of the second terminal which is conductively connected to a corresponding superimposed wall portion of the case.

The self-healing condensers and the particular construction of the case which serves at a connector to the second terminal, are both important elements of the combination of the present invention.

The self-healing condensers are made of insulating bands with vaporized coatings and reinforced rims, the coatings being subdivided into strip-shaped portions. By the use of self-healing condensers instead of metal foil condensers, the volume of each condenser is reduced, and the coil inductance is also reduced while the permissible voltage load is increased resulting in very high safety for operations with capacitor arrangement storing a very great amount of electric energy.

The construction of the connector to the second terminal as a case enveloping the capacitor units and conducting the current between the ends of the condenser, and the provision of concentric terminals on the same side of the housing further substantially reduces the inductance and contributes to a further improvement of the safety of operation of the capacitor arrangement under surge discharge conditions.

While the construction of the conductive enveloping case alone effect a substantial reduction of the inductance of the capacitor units, the combination of this element with self-healing condensers results in a substantial improvement of the capacitor which is particularly of decisive importance for the use of the capacitor for surge discharges.

Another feature of the invention which reduces the inductance of the capacitor, is the flat shape of the parts through which the first terminal passes.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 3 is a fragmentary sectional view on an enlarged scale illustrating a modified construction;

FIG. 4 is a side elevation of two capacitor units according to a modified embodiment;

FIG. 5 is a plan view of the capacitor units shown in FIG. 4;

FIG. 6 is a side view of a capacitor unit having two independent terminals; and

FIG. 7 is a plan view of the capacitor unit shown in FIG. 6.

Figure 1:
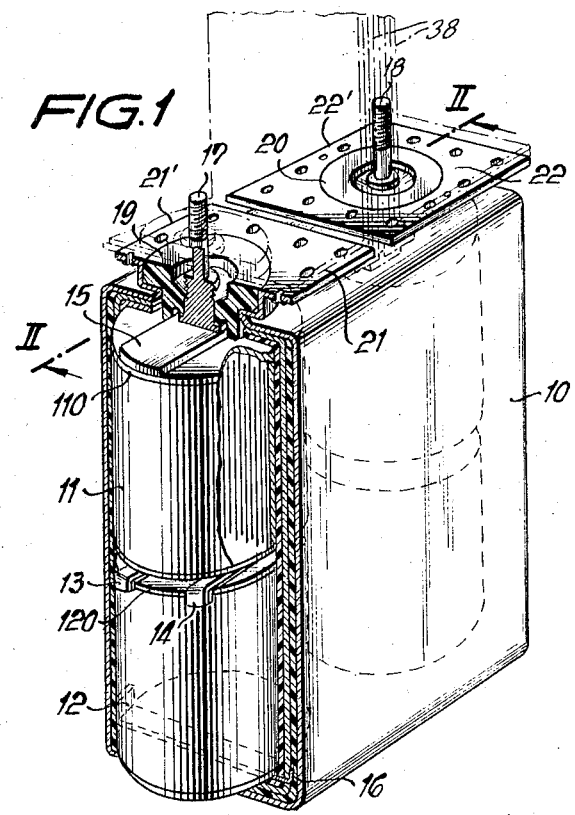
FIG. 1 is a perspective view showing a capacitor unit partially in section.
Figure 2:
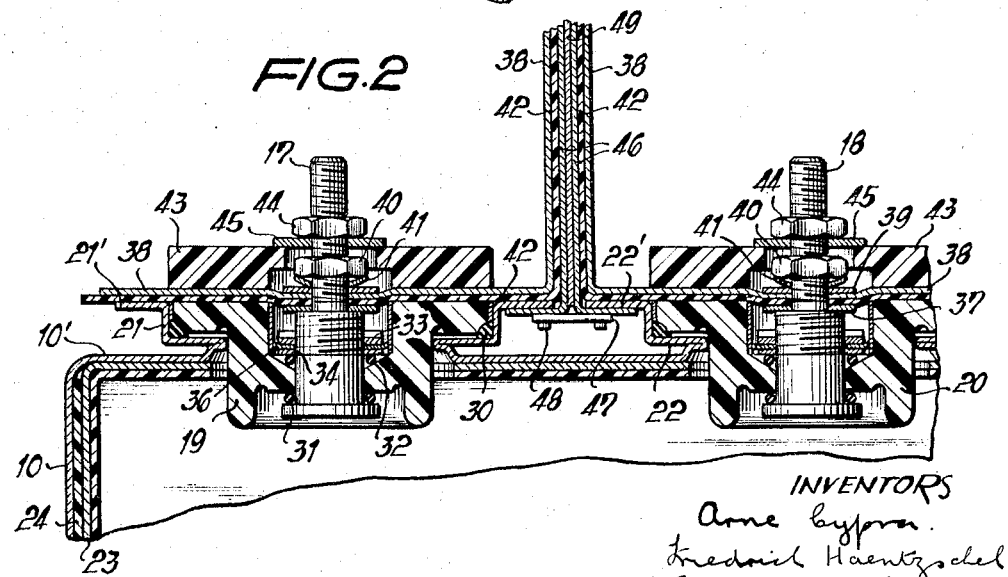
FIG. 2 is a fragmentary sectional view on an enlarged scale taken on line II—II in FIG. 1.

Referring now to the drawings, and more particularly to FIGS. 1 and 2, an outer housing 10 consisting of steel is insulated by an insulating layer 24 from an inner case 23, with the exception of the wall portion 10' which is soldered to a corresponding wall portion of the top wall of case 23. Two columns, each of which comprises two tubular self-sealing condensers 11 and 12, are located within case 23 and insulated from the same by an insulating layer 24.

At the ends of each condenser 11 or 12 conductive layers are vaporized on shunting connector plates 110 and 120. Two copper bands 13 and 14 are respectively soldered to the confronting connector plates 110 and 120, and are soldered to each other so that the condensers of the same column are connected in series. Copper bands 15 and 16 are soldered to the other connector plates 110 and 120. The band 15 passes over the connector plates at the ends of both adjacent columns, only one of which is shown in FIG. 1, so that the respective pairs of condensers 11 and 12 are connected in parallel. The connector plate 120 at the lower ends of the columns are connected by two bands 16 to case 23. Each connector band 16 passes through the inner insulating layer 24 and through a corresponding opening in case 23, and being soldered to the outside of the case 23.

A pair of terminals 21 and 22 of generally tubular shape are secured by soldering to circular edges surrounding openings in housing 10. Each terminal 21 has a rectangular flange 21' provided with bores through which screws may be inserted, and a dished portion in which an annular insulator 19 is located. Inner terminals 17 and 18 are coaxial with the terminals 21 and 22, and pass through corresponding openings in housing 10, case 23, and insulators 19 and 20 into the interior of casing 23 where they abut with large end faces on the copper band 15.

Since terminals 21 and 22 are conductively connected to portions 10' of housing 10 which is also conductively connected to the case 23, and since case 23 is connected by connector members 16 to the connector plate 120 of the condensers, the second terminals 21 and 22 are connected to the lower ends 120 of the condenser columns, while the terminals 17 and 18 are connected to the upper ends 110 of the condenser columns.

It is therefore apparent that the case 23, which preferably consists of copper, conducts the condenser currents to the second terminals 21 and 22.

The rectangular flanges 21' and 22' of the second terminals 21 and 22 are located in a common plane with the top surfaces of the annular insulators 19 and 20 which results in low inductance of the terminals.

As best seen in FIG. 2, packing rings 30 are located in dished portions of the terminals 21 and 22 and support flanges of the annular insulator members 19 and 20 which have tubular portions passing through the openings in housing 10 and case 23, and surrounding the lower portions of the first terminals 17 and 18. The outer circular surface and the inner circular surface of the flange of insulator members 19 and 20 are metal coated and the outer circular surfaces are soldered to the corresponding surrounding portions of the tubular terminals 21 and 22.

The inner terminals 17 and 18 have a portion of larger diameter with a first thread, and a portion of smaller diameter with another thread. An annular portion of insulator 19 or 20 is in contact with the terminal 17 or 18, and a pair of rubber rings 31 and 32 is located in opposite sides of this annular portion for resiliently mounting the inner terminals 17 and 18. A washer 34 is located on rubber ring 32, a springy disc 36 is superimposed on washer 34 and is along its outer edge in conductive contact with the metal layers on the inner surface of insulator 19 or 20, and a nut 33 on a threaded portion of terminal 17 or 18 compresses the rubber rings 31 and 32 so that the inner terminals 17 and 18 are resiliently, but firmly, supported on the insulators 19 and 20, which, in turn, are secured to the second terminals 21 and 22. Due to the springy conductive disc 36, the inner metal-coated surface of the insulators will have the same potential as the terminals 17 and 18.

Washers 39 rest on the shoulders of the inner terminals 17 and 18, and cooperate with nuts 40 and spring washers 41 which are mounted on the thinner threaded portions of terminals 17 and 18. A band-shaped insulator 42, and a band-shaped conductor 38 are clamped between washers 39 and 37. A ring-shaped insulator 43 rests on the band-shaped conductor 38 in the region of the insulator 19 or 20 and is pressed by a washer 45 and a nut 44 against conductor 38.

The band-shaped conductors 38 are of angular shape and have in addition to the above-described clamped portions, perpendicular portions which are arranged equidistant from the rows of inner terminals 17 and 18 which are formed by a set of capacitor units. Other angular band-shaped conductors 46 have corresponding vertical portions separated by insulators 42 from the band-shaped conductors 38, and separated from each other by a band-shaped insulator 49. The second portions of the angular conductors 46 are clamped by plates 47 and nuts 48 against the bottom faces of the rectangular flanges 21' and 22'. In this manner, it is possible to connect a row of capacitor units by band-shaped conductors 38 and 46 in parallel, while the conductors 38 and 46 extend on top of the set of capacitor units in the plane of symmetry between the terminals 17, 21 on one side and the terminals 18 and 22 on the other side. For example, ten capacitor units of the type shown in FIG. 1 may be connected by conductor bands 38 and 46.

FIG. 3 shows a modified embodiment of the arrangement of the terminals. A copper plate 50 connects a plurality of terminals 51 in parallel. Copper plate 50 has bores, and rests on shoulders of the terminals 51. Two polycarbonate foils 52 are located below copper plate 50 and are superimposed on another copper plate 53 which is conductively connected to the housing of the capacitors. Copper plate 53 has openings for the terminals 51, the openings being filled with insulator plates 54. Additional insulating layers consisting of polycarbonate foil 55 are arranged below copper plate 53. The entire terminal arrangement is embedded in a cover 56 consisting of a cast resin which has suitable bores for the passage of the terminals 51 and is under the pressure of a plate 59 produced by nuts 57 acting on washers 58 on plate 59.

The arrangement of FIG. 3 is independent from the number of terminals passing through the housing of the capacitor, and can be used for capacitors having two terminals 62 and 63 connected in parallel in the interior of a housing 61, as shown in FIGS. 6 and 7, as well as for the construction shown in FIGS. 4 and 5 in which only one terminal 64 is provided for each capacitor unit. In both constructions, the capacitor is connected on one hand to the inner terminals 62, 63 or 64, and on the other hand to the outer terminals 66.

If several capacitor units 67 and 68, as shown in FIG. 4 and 5, are connected in parallel, the band-shaped connector extends over all capacitor units which are to be connected, while the second terminals 66 are connected by rectangular conductive plates 60 which are secured to the flanges 66 by fastening members passing through bores in the rectangular flanges. It is evident that the band-shaped conductor will have twice the width if two pairs of terminals are provided on each capacitor unit, than when only one pair of concentric terminals is provided on each capacitor unit.

Capacitor arrangements of the above described type, here, for example, in one housing four condenser columns are connected in parallel, and where each column contains six condensers connected in series, store an electric energy of 1250 watt sec. at the resonance frequency of over 350 kHz. A capacitor of this size is capable of discharging surge currents of 200,000 amps if a single inner terminal passes through the housing, and of 270,000 amps if two terminals are provided on each housing as shown in FIGS. 1 to 3, 6 and 7.

By connecting a number of capacitors of this type in parallel by means of the above described band-shaped connectors, sets of capacitors can be assembled which are capable of storing very high amounts of energy in accordance with the intended use, without any detrimental influence on the safety of the operations.

It will be understood that each of the elements described above or two or more together, may also find a useful application in other types of capacitor arrangements differing from the types described above.

While the invention has been illustrated and described as embodied in a capacitor unit having concentric terminals and an enveloping conductive case connected to the outer terminal, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A capacitor comprising, in combination, at least one condenser having connector plates at the ends thereof; a conductive case enveloping said condenser and having one end portion formed with an opening in the region of one of said connector plates, said case being insulated from said one connector plate and conductively connected to the other connector plate at the other end portion thereof; a first terminal passing through said opening and being conductively connected to said one connector plate and insulated from said case; a second terminal adjacent said first terminal spaced and insulated therefrom and being conductively connected to said one end portion of said case so that current is conducted from said one end portion of said case to said other end portion of said case; a conductive housing enveloping said case and including a first portion out of direct electrical contact with the corresponding portion of said case, and a second portion electrically connected to said case whereby the inductance is reduced.

2. A capacitor comprising, in combination, at least one condenser having connector plates at the ends thereof; a conductive case enveloping said condenser and having one end portion formed with an opening in the region of one of said connector plates; insulating means for separating said condenser from said case; a connector member passing through said insulating means and conductively connecting the other connector plate with said case at the other end portion thereof; a conductive housing enveloping said case and a major portion thereof spaced from said case, said housing having a wall portion formed in the remainder thereof with an opening registering with said opening, said wall portion being electrically connected with said one end portion of said case; insulating means interposed between said major portion of said housing and the corresponding spaced portion of said case; a first terminal passing through said opening and being conductively connected to said one connector plate and insulated from said case; and a second tubular terminal surrounding said first terminal spaced and insulated therefrom and being conductively connected to said wall portion of said housing and thereby to said one end portion of said case so that current is conducted from said one end portion of said case to said other end portion of said case whereby the inductance is reduced.

3. A capacitor comprising, in combination, at least one self-healing condenser having connector plates at the ends thereof; a conductive case enveloping said condenser and having one end portion formed with an opening in the region of one of said connector plates; means for separating said condenser from said case; a connector member passing through said insulating means and conductively connecting the other connector plate with said case at the other end portion thereof; a conductive housing enveloping said case and a major portion thereof spaced from said case, said housing having a wall portion formed in the remainder thereof with an opening registering with said opening, said wall portion being electrically connected with said one end portion of said case; insulating means interposed between said major portion of said housing and the corresponding spaced portion of said case; a first terminal passing through said opening and being conductively connected to said one connector plate and insulated from said case; and a second tubular terminal surrounding said first terminal spaced and insulated therefrom and being conductively connected to said wall portion of said housing and thereby to said one end portion of said case so that current is conducted from said one end portion of said case to said other end portion of said case whereby the inductance is reduced.

4. A capacitor comprising, in combination, at least one self-healing condenser having connector plates at the ends thereof; a conductive case enveloping said condenser and having one end portion formed with an opening in the region of one of said connector plates, said case being insulated from said one connector plate and conductively connected to the other connector plate at the other end portion thereof; a first terminal passing through said opening and being conductively connected to said one connector plate and insulated from said case; a second terminal adjacent said first terminal spaced therefrom and being conductively connected to said one end portion of said case so that current is conducted from said one end portion of said case to said other end portion of said case; a conductive housing enveloping said case and electrically connected to said case only at one of said end portions of the latter whereby the inductance is reduced, said second terminal having a dished portion; and an annular insulator located in said dished portion and surrounding said first terminal.

5. A capacitor comprising, in combination, at least one self-healing condenser having connector plates at the ends thereof; a conductive case enveloping said condenser and having one end portion formed with an opening in the region of one of said connector plates, said case being insulated from said one connector plate and conductively connected to the other connector plate at the other end portion thereof; a first terminal passing through said opening and being conductively connected to said one connector plate and insulated from said case; a second terminal adjacent said first terminal spaced therefrom and being conductively connected to said one end portion of said case so that current is conducted from said one end portion of said case to said other end portion of said case; a conductive housing enveloping said case and electrically connected to said conductive case only at said one end portion of the latter whereby the inductance is reduced; an annular insulator surrounding said first terminal and being located within said second terminal, said annular insulator having an annular inner surface coated with a conductive layer, said conductive layer being conductively connected with said first terminal.

6. A capacitor comprising, in combination, at least one self-healing condenser having connector plates at the ends thereof; a conductive case enveloping said condenser and having one end portion formed with an opening in the region of said connector plates, said case being insulated from said one connector plate and conductively connected to the other connector plate at the other end portion thereof; a first terminal passing through said opening and being conductively connected to said one connector plate and insulated from said case; a second terminal adjacent said first terminal spaced therefrom and being conductively connected to said one end portion of said case so that current is conducted from said one end portion of said case to said other end portion of said case; a conductive housing enveloping said case and electrically connected to said conductive case only at said one end portion of the latter whereby the inductance is reduced; an annular insulator surrounding said first terminal and being located within said second terminal, said annular insulator having an annular inner surface coated with a conductive layer, said conductive layer being conductively connected with said first terminal, said annular insulator having an annular outer surface coated with a conductive layer which is conductively connected with said second terminal.

7. A set of capacitors, each capacitor comprising at least one self-healing condenser having connector plates at the ends thereof; a conductive case enveloping said condenser and having one end portion formed with an opening in the region of one of said connector plates; insulating means for separating said condenser from said case; a connector member passing through said insulating means and conductively connecting the other connector plate with said case at the other end portion thereof; a conductive housing enveloping said case and having a wall portion formed with an opening registering with said opening, said wall portion being conductively connected with said one end portion of said case; insulating means located between said case and said housing; a first terminal passing through said opening and being conductively connected to said one connector plate and insulated from said case; and a second tubular terminal surrounding said first terminal spaced and insulated therefrom and being conductively connected to said wall portion of said housing and thereby to said one end portion of said case so that current is conducted from said one end portion of said case to said other end portion of said case whereby the inductance is reduced, said second terminal having a rectangular flange; a first band-shaped conductor abutting and conductively connected to said flanges of said second terminals; a second band-shaped conductor conductively connected with said first terminals; and band-shaped insulating means between said band-shaped conductors.

8. A set of capacitors as set forth in claim 7 wherein each first terminal has an annular shoulder; wherein said second band-shaped conductor has a plurality of openings through which said first terminals pass, said second band-shaped conductor abutting on said shoulders; and means for pressing said second band-shaped conductor against said shoulders.

9. A set of capacitors as set forth in claim 8 wherein each capacitor includes an annular insulator between said first and second terminals, said band-shaped insulating means abutting said annular insulators; and means for pressing said second band-shaped conductor and said band-shaped insulating means against said annular insulators.

10. A set of capacitors as set forth in claim 7 wherein said capacitors are aranged in pairs to form two rows of capacitors, two rows of first terminals, and two rows of second terminals; a pair of first angular band-shaped conductors extending between said rows of terminals, each band-shaped conductor having a first portion conductively connected to said first terminals of one of said rows of first terminals, and a second portion extending perpendicular to said first portion, a pair of second angular band-shaped conductors extending between said rows of terminals and between said first band-shaped conductors, each second angular band-shaped conductor having a first portion conductively connected to said second terminals of one of said rows of second terminals, and a second portion extending perpendicular to said first portion thereof and being located between said second portions of said first band-shaped conductor; and insulating bands between said first and second band-shaped conductor and between said second portions of said second band-shaped conductors.

11. A high voltage capacitor arrangement for surge discharges comprising a plurality of capacitor units, each capacitor unit comprising two columns of coiled tubular self-healing condensers located adjacent each other and having ends located in common parallel planes, each condenser having a first connector plate located in one of said planes and a second connector plate located in the other plane; a conductive case enveloping said two condensers and having two openings in the region of said first connector plates; first insulating means for separating said condensers from said case; a conductive housing enveloping said case and a major portion of said housing being spaced from said case, said housing having two openings registering with said openings in said case, said case and said housing having adjacent said openings annular portions abutting each other and being electrically conductively connected; second insulating means interposed between said major portion of said housing and the corresponding spaced portion of said case for separating said portions of said case and said housing from each other and being interrupted in the region of said abutting wall portions; two connector members having large faces conductively connected to said second connector plates and passing through said first insulating means and being conductively connected to said case while being separated by said second insulating means from said housing; a pair of first terminals passing through said openings spaced from said abutting wall portions and having large end faces respectively abutting said first connector plates, and a second tubular terminal surrounding each of said first terminals spaced therefrom and being conductively connected to said annular wall portion of said housing and thereby to said case so that current is conducted in said case between the ends of said condensers along the same whereby the inductance is reduced.

12. A high voltage capacitor arrangement for surge discharges comprising a plurality of capacitor units, each capacitor unit comprising two columns of coiled tubular self-healing condensers located adjacent each other and having ends located in common parallel planes, each condenser having a first connector plate located in one of said planes and a second connector plate located in the other plane; a conductive case enveloping said two condensers and having two openings in the region of said first connector plates; first insulating means for separating said condensers from said case; a conductive housing enveloping said case and having two openings registering with said openings in said case, said case and said housing having adjacent said openings annular portions abutting each other and being conductively connected; second insulating means for separating said case and said housing from each other and being interrupted in the region of said abutting wall portions; two connector members having large faces conductively connected to said second connector plates and passing through said first insulating means and being conductively connected to said case while being separated by said second insulating means from said housing; a pair of first terminals passing through said openings spaced from said abutting wall portions and having large end faces respectively abutting said first connector plates; a second tubular terminal surrounding each of said first terminals spaced therefrom and being conductively connected to said annular wall portion of said housing and thereby to said case so that current is conducted in said case between the ends of said condensers along the same whereby the inductance is reduced, each of said second terminals having a dished portion and a flange surrounding said dished portion; an annular insulator between each first and second terminal; said annular insulator having conductive coatings on the inner and outer surfaces thereof, said coatings being, respectively, conductively connected to said first and second terminals, and each of said annular insulators including a flange portion located in said dished portion and having a surface flush with said flange and a tubular portion passing through said openings in said face and in said housing; first band-shaped conductor means connected to said first terminals of said capacitor units; second band-shaped conductor means conductively connected to said flanges of said second terminals; and band-shaped insulating means between said first and second conductor means.

13. A capacitor arrangement as set forth in claim 12 wherein each first terminal has a shoulder and a threaded portion; first nut means on said threaded portion for pressing said first conductor means toward said shoulders; an insulator ring resting on said first conductor means in the region of said flange portion of said annular insulator; and second nut means on said threaded portion for pressing said insulator ring against said first band-shaped conductor means and against said insulator.

14. A capacitor arrangement as set forth in claim 13 wherein said band-shaped insulating means extends between said flanges of said second terminals and said first conductor means.

15. A capacitor arrangement as set forth in claim 13 wherein said first terminals are resiliently mounted on said annular insulators.

References Cited by the Examiner

UNITED STATES PATENTS

| 2,127,352 | 8/1938 | Dubilier | 317—242 |
| 3,014,167 | 12/1961 | Winter | 317—260 |
| 3,024,393 | 3/1962 | Ferrante | 317—242 |
| 3,024,394 | 3/1962 | Salisbury | 317—261 |

LEWIS H. MYERS, *Primary Examiner.*

W. L. CARLSON, *Assistant Examiner.*